United States Patent [19]

Arnce

[11] Patent Number: 4,711,635
[45] Date of Patent: Dec. 8, 1987

[54] QUICK CHANGE SELF-OILING SPROCKET HUB

[75] Inventor: John W. Arnce, Wichita, Kans.
[73] Assignee: Richard Lee Plush, Jr., Topeka, Kans.
[21] Appl. No.: 774,487
[22] Filed: Sep. 10, 1985
[51] Int. Cl.⁴ ............................................. F16H 55/30
[52] U.S. Cl. ..................................................... 474/152
[58] Field of Search ..................... 474/152, 91, 43–45, 474/902, 903; 184/15.1; 74/594.2

[56] References Cited

U.S. PATENT DOCUMENTS

| | | | |
|---|---|---|---|
| 782,276 | 2/1905 | Roebling | 184/15.1 X |
| 2,436,694 | 2/1948 | Hornbrook, Jr. et al. | 474/152 |
| 2,737,264 | 3/1956 | Klaucke | 184/15.1 |
| 2,787,483 | 4/1957 | Harvey et al. | 474/152 |

FOREIGN PATENT DOCUMENTS 735468  11/1932  France ................................ 474/152

Primary Examiner—Stephen J. Novosad
Assistant Examiner—Thuy M. Bui
Attorney, Agent, or Firm—John Wade Carpenter

[57] ABSTRACT

A quick change self-oiling sprocket hub having a first ring including an essentially hollow structure with a threaded circumference. The hollow structure of the first ring defines an oil input aperture for filling the hollow structure with oil and an oil discharge aperture for dispensing oil. A second ring is concentrically integrally bound to the first ring an has a greater diameter than the first ring such that the overlap of the second ring to the first ring represents a flange. At least one locating pin is secured to the flange for releasably holding at least one sprocket member to the flange. The quick change self-oiling sprocket hub additionally comprises a compression retaining ring with a plurality of ring apertures circumferentially disposed along its perimeter. The compression retaining ring threadably engages the threaded circumference of the first ring for retaining the sprocket member to the locating pin and for compressing the sprocket member against the flange.

23 Claims, 14 Drawing Figures

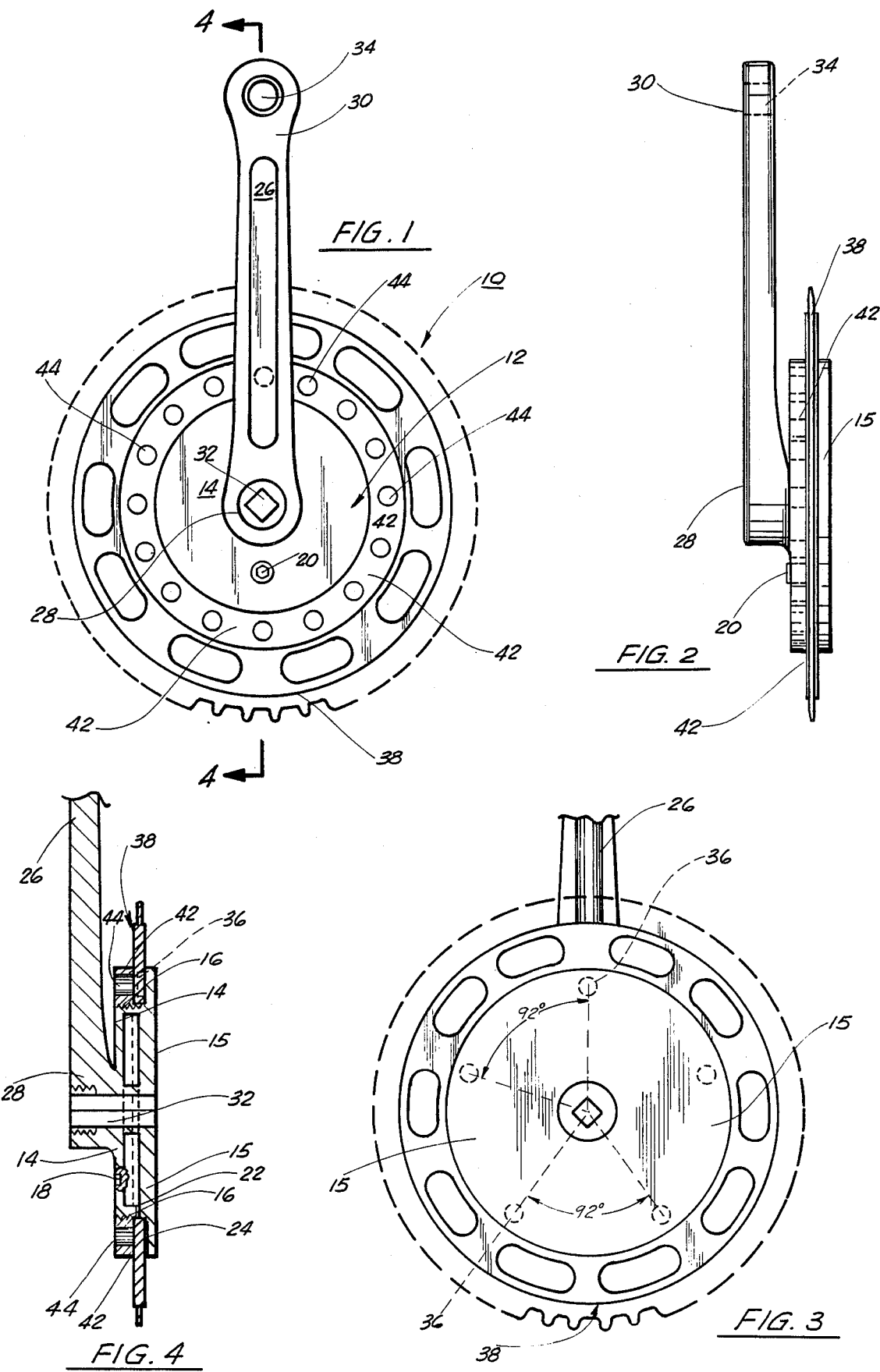

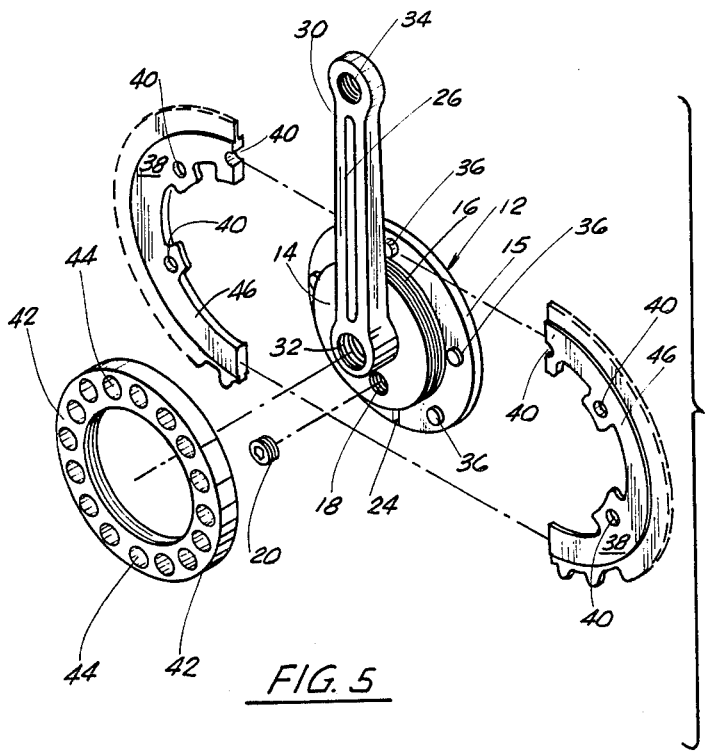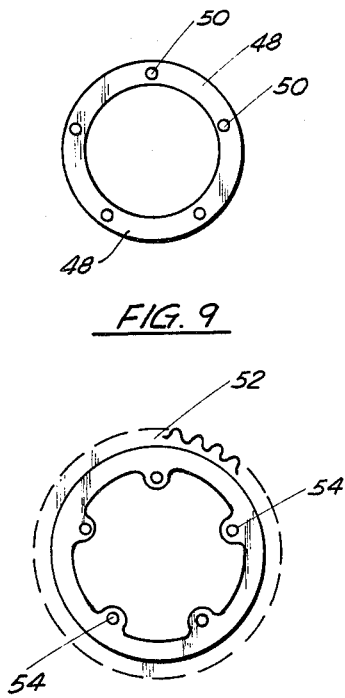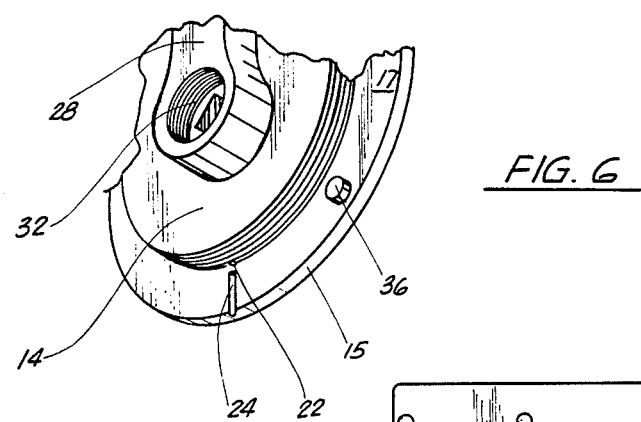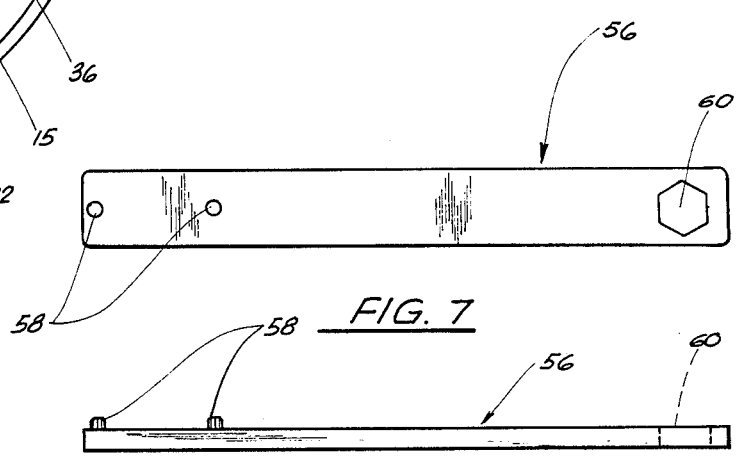

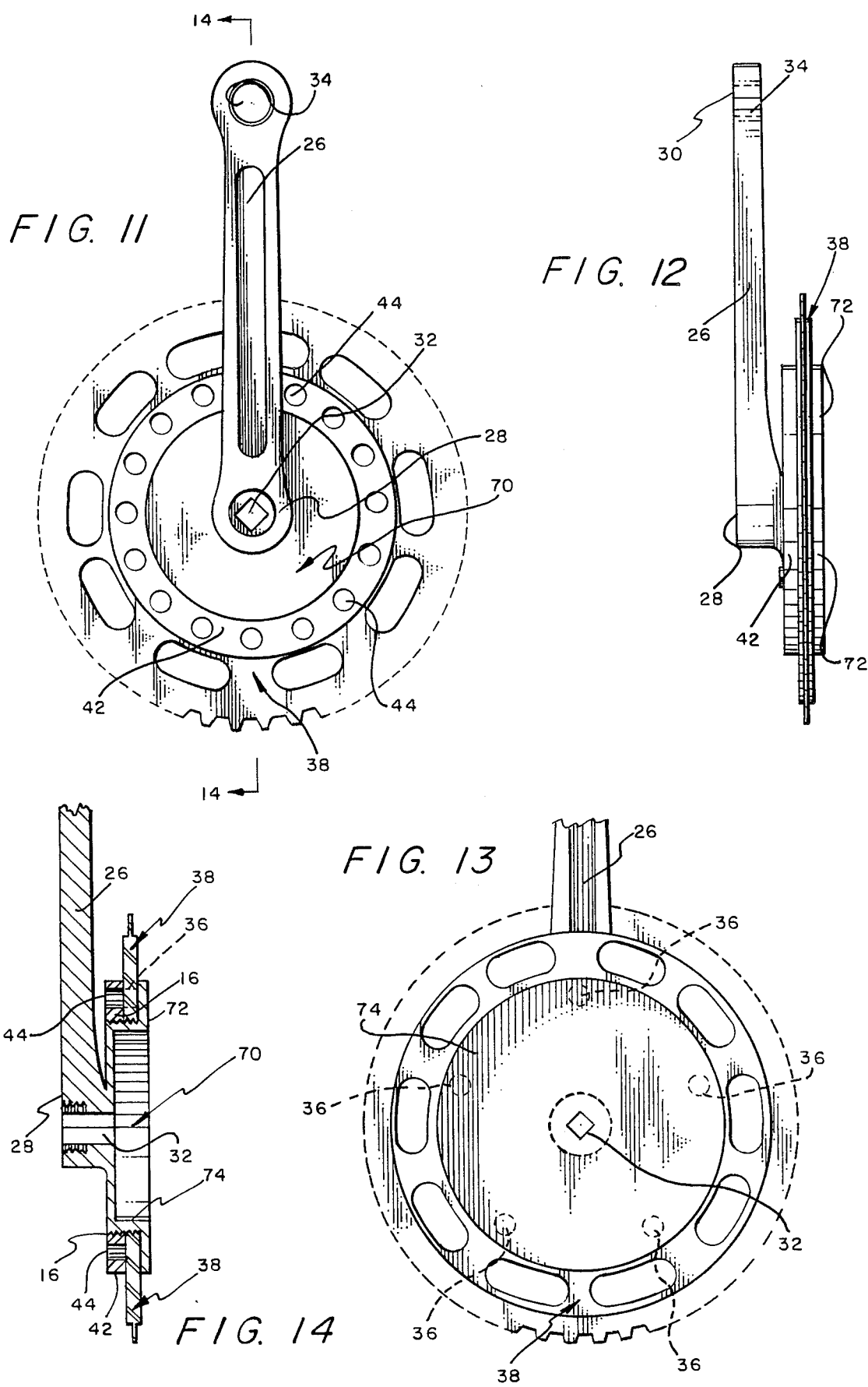

QUICK CHANGE SELF-OILING SPROCKET HUB

BACKGROUND OF THE INVENTION

1. Field of the Invention

This invention is related to a sprocket hub. More specifically, this invention provides a quick change, self-oiling sprocket hub for a bicycle.

2. Description of the Prior Art

U.S. Pat. No. 782,276 by Roebling discloses an oil device for chain-wheels and provides a simple, convenient, and efficient means for oiling the chain of outside-driving automobiles. U.S. Pat. No. 1,914,093 by Adams teaches a sprocket-and-change system whereby the same may be constantly and at all times automatically supplied with lubricant in a manner to assure that the chain and associated parts will be thoroughly lubricated without the attention of an attendant for the purposes. U.S. Pat. No. 2,737,264 to Klaucke relates to automobile lubricators for power transmission chains and/or specifically chains of the lower type. U.S. Pat. No. 4,201,120 by Segawa teaches a gear crank for a bicycle which comprises a crank shaft, a pair of crank arms and a chain gear, at least one of the crank arms being formed independently of the crank shaft and fixed there-together with the chain gear by means of a fixing means. None of the foregoing prior art patents teach or suggest the particular gear change self-oiling sprocket hub of this invention.

SUMMARY OF THE INVENTION

The present invention accomplishes its desired objects by broadly providing a quick change self-oiling sprocket hub comprising a hub means having a structure defining a hub flange and a hollow hub section with at least one oil aperture. The quick change self-oiling sprocket hub additionally comprises means bound to the hub means for releasably holding at least one sprocket means to the hub means, and a means releasably secured to the hollow hub section for retaining the sprocket means to the means for releasably holding the sprocket means to the hub means and for compressing the sprocket means against the hub flange. The hollow hub section includes a structure defining an oil intake aperture and an oil discharge aperture. The means releasably secured to the hollow hub section for retaining the sprocket means and for compressing the sprocket against the hub flange comprising a compression ring retainer means with a plurality of ring apertures disposed on its perimeter and threadably engaged to the hollow hub section. At least one locating pin means is secured to the hub flange for releasably holding the sprocket means to the hub flange. The hub flange has a relief recess wherethrough oil flows from the oil discharge aperture to contact the sprocket means. The quick change self-oiling sprocket hub additionally comprises a crank-arm means having a first crank end integrally bound centrally to the hollow hub section.

Therefore, it is an object of the present invention to provide a sprocket hub.

It is another object of this invention to provide a quick change self-oiling sprocket hub for a bicycle, or the like.

It is yet another object of this invention to provide a quick change, self-oiling sprocket hub wherein a sprocket member may be quickly changed from a sprocket hub without removing the entire hub assembly from the bicycle, or the like.

These, together with the various ancillary objects and features which will become apparent to those skilled in the art as the following description proceeds, are attained by this quick change, self-oiling sprocket hub, a preferred embodiment being shown with reference to the accompanying drawings, by way of example only, wherein:

BRIEF DESCRIPTION OF THE DRAWINGS

FIG. 1 is a front elevational view of the quick change, self-oiling sprocket hub;

FIG. 2 is a side elevation view of the sprocket hub of FIG. 1;

FIG. 3 is a partial rear elevational view of the sprocket hub of FIGS. 1 and 2;

FIG. 4 is a partial vertical sectional view taken in direction of the arrows and along the plane of line 4—4 in FIG. 1;

FIG. 5 is a segmented perspective view of the quick change, self-oiling sprocket hub with the sprocket member being of the bisected embodiment;

FIG. 6 is a partial enlarged perspective view of the lower portion of the hub disclosing the hollow section of the hub, the hub flange, the relief recess in the hub flange, and the oil discharge aperture for dispensing oil into the relief recess;

FIG. 7 is a top plan view of the spaner wrench which accompanies the quick change, self-oiling sprocket hub;

FIG. 8 is a side elevational view of the spaner wrench disclosing the two dowell;

FIG. 9 is a top plan view of an adapter ring which may accompany the quick change, self-oiling sprocket hub; and FIG. 10 is a top plan view of a second sprocket member which also may accompany the quick change, self-oiling sprocket hub.

FIG. 11 is a front elevational view of the quick change sprocket hub;

FIG. 12 is a side elevational view of the sprocket hub of FIG. 11;

FIG. 13 is a partial rear elevational view of the sprocket hub of FIGS. 11 and 12; and FIG. 14 is a partial vertical sectional view taken in direction of the arrows and along the plane of line 14—14 in FIG. 11.

DETAILED DESCRIPTION OF THE INVENTION

Referring in detail now to the drawings wherein similar parts of the invention are identified by like reference numerals, there is seen the quick change self-oiling sprocket hub, generally illustrated as 10, comprising a hub, generally illustrated as 12, having a ring 14 which is almost entirely hollow and includes a threaded circumference 16. A second ring 15 is concentrically integrally bound to the hollow ring 14 and has a greater diameter than the hollow ring 14 such that the overlap of the second ring 15 to the hollow ring 14 is a flange 17 (see FIGS. 5 and 6). Flange 17 has a relief recess 24.

Hollow ring 14 has an oil input aperture 18 for putting oil into the hollow ring 14 and is closed by a cap 20 threadably engaging the oil input aperture 18 (see FIG. 5). Hollow ring 14 also has an oil discharge aperture 22 (see FIG. 6) disposed in close proximity to the edge where the hollow ring 14 is integrally bound to the secured ring 15. Oil is centrifugally dispensed from the oil aperture 22 into the relief recess 24.

The quick change self-oiling sprocket hub 10 of this invention also has a crank-arm 26 with a longitudinal axis and first end 28 and a second end 30. The first end 28 is integrally, centrally bound to the hollow ring 14, and has a hub opening 32 therethrough. Hub opening 32 also extends through the essentially hollow ring 14 and the second ring 15 in order to receive a shaft (not shown in the drawings) about which the sprocket hub 10 rotates. The second end 30 of the crank-arm 26 has an aperture 34 wherein a pedal (not shown in the drawings) threadably lodges to receive a foot of a user in order to rotate the sprocket hub 10 about the shaft whereupon centrifugal force causes oil to be emitted from the hollow section of the hollow ring 14 through the oil discharge aperture 22 and into the relief recess 24. The oil discharge aperture 22 registers with the longitudinal axis of the crank-arm 26.

At least one locating pin 36 is secured to the flange 17 for releasably holding a sprocket, generally illustrated as 38, to the flange 17. In a preferred embodiment of the invention there are five locating pins 36 disposed along the flange 17 such as to have an about 92° arc in between the center points of any two given locating pins 36 (see FIG. 3). Sprocket 38 has at least one pin aperture 40 (see FIG. 5) wherethrough the locating pin 36 removably lodges for releasably holding and supporting the sprocket 38 to the flange 17 of the second ring 15.

A compressor ring retainer 42, with a plurality of ring apertures 44 circumferentially disposed along its perimeter, is threadably engaged to the threaded circumference 16 of the hollow ring 14 for retaining the sprocket 38 to and on the locating pins 36 and for compressing the sprocket 38 against the flange 17 of the second ring 15.

In a preferred embodiment of the invention, sprocket 38 has two preferred embodiments. In the preferred embodiment of FIGS. 1 and 3, sprocket 38 is unitary with one whole structure. In the preferred embodiment in FIG. 5, sprocket 38 is bisected into two equal sprocket parts 46—46 that are circumferentially mated together into an abutting relationship. Such an abutting relationship is maintained by the locating pins 36 slidably passing and lodging in the pin apertures 40 of the two sprocket parts 46—46, readily understandable to those artisans in the art.

The quick change self-oiling sprocket hub 10 of this invention may additionally comprise an adaptor ring 48 (see FIG. 9) with at least one adaptor aperture 50 along its circumferential perimeter; and a second sprocket 52 having at least one second pin aperture 54 (see FIG. 10). The second sprocket 52 has a smaller diameter than sprocket 38. After any one of the two embodiments of the sprocket 38 is mounted to the flange 17 of the second ring 15, the adaptor ring 48 is mounted to the flange 17 and is flushed against the sprocket 38. Mounting of the adaptor ring 48 is accomplished by passing the locating pins 36 through the adaptor apertures 50. After the adaptor ring 48 is mounted, the second sprocket 52 is mounted to the flange 17 of the second ring 15 by removably passing and lodging the locating pins 36 through the second pin apertures 54 in order that the flange 17 can releasably hold and support the second sprocket 52. The compressor retainer ring 42 threadably engages the threaded circumference 16 of the hollow ring 14 in order to retain and compress against the flange 17 of the second ring 15 the sprocket 38, the adaptor ring 48, and the second sprocket 52, in order stated. It should be understood that the second sprocket 52 may have the same two preferred embodiments of the sprocket 38; that is, the unitary embodiment and the bisected embodiment.

The sprocket 38, adaptor ring 48 and second sprocket 52 assembly embodiment of my quick change self-oiling sprocket hub 10 is to adapt my quick change self-oiling sprocket hub 10 to a 10-speed bicycle.

My quick change self-oiling sprocket hub 10 preferably additionally comprises in combination therewith a spaner wrench, generally illustrated as 56 (see FIGS. 7 and 8), which has a pair of dowells 58—58 and a broach aperture 60. The dowells 58—58 insert into any two predetermined ring apertures 44—44 for tightening and loosening the compressor ring retainer 42 around and from the threaded circumference 16 of the hollow ring 14. Preferably the dowells 58—58 insert into any two given every other ring apertures 44—44 to get more leverage in tightening and loosening the compressor ring retainer 42. The broach aperture 60 may fit around a hexagonal nut (not shown in the drawings) for tightening and loosening the same.

With continuing reference to the drawings for operation of the invention, my quick change self-oiling sprocket hub 10 is rotatably mounted to a bicycle by slidably disposing a shaft (not shown in the drawings) through the hub opening 32. A pedal (not shown in the drawings) is threadably engaged to the aperture 34 for receiving a foot of a user. Oil is placed in the inside of the hollow section of the hollow ring 14 by threadably disengaging the cap 20 from the oil input aperture 18 and pouring the desired quantity of oil into the hollow section. The cap 20 is threadably replaced into the oil input aperture 18 to retain the oil in the hollow ring 14.

Sprocket 38 has to be mounted on the flange 17 of the sprocket hub 10. It may be mounted to the sprocket hub 10 prior to mounting the same on the bicycle; or it may be mounted to the bicycle after the sprocket hub 10 is in place on the bicycle because one of the unique features of my invention is that it allows the quick replacement of a sprocket 38 with another sprocket similar to sprocket 38, but perhaps of different size, without having to remove the sprocket hub 10 and while the sprocket hub 10 is rotatably positioned on the bicycle.

Mounting of the sprocket 38 to the quick change self-oiling sprocket hub 10 is easily accomplished by inserting the pair of dowells 58—58 of the wrench 56 into two appropriate ring apertures 44—44 of the compression ring retainer 42 and loosening the same from around the hollow section of the ring 14 by a counter clockwise leveraged rotation of the ring retainer 42. After the compression ring retainer 42 has been unscrewed from around the hollow section of the hollow ring 14, it is removed from the sprocket hub 10 by sliding the ring retainer 42 up the crank-arm 26. The compression ring retainer 42 has an open area in the middle thereof and the crank-arm 26 passes through this open area when the ring retainer 42 is removed therefrom. Any pedal that is too wide for the compression ring retainer 42 to pass over would have to be threadably removed from aperture 34 prior to removing the ring retainer from around the crank-arm 26.

After removal of the compression retainer ring 42, one of the two embodiments of the sprocket 38 is mounted onto the flange 17 of the second ring 15 by slidably disposing the locating pins 36 through the pin apertures 40. If the unitary embodiment of the sprocket 38 is utilized, the unitary sprocket 38 is slid down the crank-arm 26 by passing the crank-arm 26 through the open area in the middle of the unitary sprocket 38. In the bisected embodiment of the sprocket 38 wherein the sprocket 38 has two equal sprocket parts 46—46, the two equal sprocket parts 46—46 are circumferentially mated into an abutting relationship and the locating pins 36 are slid through the pin apertures 40 of the abutted equal sprocket parts 46—46 in order to retain the abutting relationship between the two equal parts 46—46 and to mount the abutted equal sprocket parts 46—46 to the flange 17 of the second ring 15. It should be understood and is readily discernible to the artisans, that one of the nice features of the bisected embodiment of the sprocket 38 is that the compressor ring retainer 42 does not have to be entirely removed from around the crank-arm 26 to posture the bisected embodiment of the sprocket 38 against the flange 17 of the second ring 15.

After the desired embodiment of the sprocket 38 has been mounted to the flange 17, the open area of the compression ring is subsequently passed around the crank-arm 26 and is threadably screwed to the threaded circumference 16 of the hollow section of the hollow ring 14 until the desired embodiment of the sprocket 38 is securedly flushed against the face of the flange 17 of the second ring 15 while simultaneously the locating pins 36 pierce the pin apertures 40 to support the sprocket 38 in an affixed vertical position. The spaner wrench 56 may be used to tighten the compression ring retainer 42.

If a 10-speed modification is desired, the adaptor ring 48 and the second sprocket 52 have to be mounted in order stated before the ring retainer 42 rotatably engages the threaded circumference 16 of the hollow ring 14. The adaptor ring 48 is slid down and around the crank-arm 26 and is mounted to the flange 17 by sliding it over the hollow ring 14 and slidably disposing the locating pins 36 through the adaptor apertures 50. The second sprocket 52 is mounted similarly to sprocket 38. Sprocket 52 is slid down and around the crank-arm 26, and is mounted to the flange 17 by sliding the open area over and around the hollow ring 14 and slidably lodging the locating pins 36 through the second pin apertures 54. Subsequent to the mounting of the adaptor ring 48 and the second sprocket 52, the compressor ring retainer 42 may be rotatably engaged to the threaded circumference 16 of the hollow ring 14 to compress the sprocket 38, the adaptor ring 48, and the second sprocket 52 against each other and the face of the flange 17 and to retain the locating pins 36 through the pin apertures 40, the adaptor apertures 50, and the second pin apertures 54.

When an endless chain sprocketedly engages the teeth of the sprocket 38 or the sprocket 52, and the user rotates the quick change self-oiling sprocket hub 10 by imparting rotational torque on the pedal, the quick change self-oiling sprocket hub 10 rotates about the shaft and the centrifugal force from the rotation forces oil from within the hollow ring 14 through the oil discharge aperture 22, and out of the hollow ring 14, and into the relief recess 24 wherethrough the oil centrifugally flows and centrifugally passes onto the sprocket 38, or the sprocket 52, for eventual contact of the oil with the endless chain passing over and around the sprocket 38, or the sprocket 52. Without the centrifugal force from rotation of the sprocket hub 10 including the hollow section of the hollow ring 14, oil would not generally be discharged through the oil discharge aperture 22 and into the relief recess 24 on the flange 17.

Another embodiment of my invention is a sprocket hub with the quick change sprocket features but without the self-oiling aspects, more particularly disclosed and illustrated in FIGS. 11-14. In this embodiment of my invention, there is no hollow section for oil because there is no hollow ring 14. There is also no oil input aperture 18, no oil discharge aperture 22 and no relief recess 24. The quick change sprocket feature, the sprocket 38 features, and the wrench 56 features are identical.

For this embodiment of my invention, the sprocket hub, generally illustrated as 70 (see FIGS. 11-14) is of unitary integral structure and has the same threaded circumference 16 as the quick change self-oiling sprocket hub 10, and has a hub flange 72 which is, for all practical purposes, structurally the same as the flange 17 of the second ring 15. The same at least one locating pin 36 is secured to the hub flange 72 for releasably holding the sprocket 38. The compressor ring retainer 42 in this embodiment is the same compressor ring retainer 42, with the plurality of apertures 44 circumferentially disposed along its perimeter and threadably engaged to the threaded circumference 16 of the hub 70 for retaining the sprocket 38 to and on the locating pins 36 and for compressing the sprocket 38 against the hub flange 72. Hub 70 for this embodiment of my invention is lighter in weight because there is a hub recess 74 within the boundaries of the hub flange 72.

The operation of the invention in the removal and the replacement of the sprocket 38 to the sprocket hub 70 through utilization of the compressor ring retainer 42 is identical to my quick change self-oiling embodiment. The 10-speed modification features (i.e. adaptor ring 48 and second sprocket 52) may be present in this quick-change embodiment.

While the present invention has been described herein with reference to particular embodiments thereof, a latitude of modification, various changes and substitutions are intended in the foregoing disclosure, and it will be appreciated that in some instances, some features of the invention will be employed without a corresponding use of other features, without departing from the scope of the invention as set forth.

I claim:

1. A quick change self-oiling sprocket hub comprising a hub means including a first ring means having an essentially hollow structure with a threaded circumference and defining an oil input aperture for filling the hollow structure with oil and an oil discharge aperture for dispensing oil, and a second ring means concentrically integrally bound to the first ring means and having a greater diameter than said first ring means, such that the overlap of the second ring means to the first ring means defines a second ring flange means:

at least one locating pin means secured to said second ring flange means for releasably holding at least one sprocket means to said second ring flange means; and a compressor ring retainer means with a plurality of ring apertures circumferentially disposed on its perimeter and threadably engaged to the threaded circumference of the first ring means.

2. The quick change self-oiling sprocket hub of claim 1 additionally comprising a crank-arm means with a longitudinal axis and having a first crank end integrally bound centrally to said first ring means.

3. The quick change self-oiling sprocket hub of claim 2 wherein a hub opening extends through said first crank end, said first ring means, and said second ring means.

4. The quick change self-oiling sprocket hub of claim 3 wherein said crank-arm means additionally comprises a second crank end with a crank-arm aperture.

5. The quick change self-oiling sprocket hub of claim 1 wherein said second ring flange means has a relief recess wherethrough oil flows from the oil discharge aperture to contact said sprocket means.

6. The quick change self-oiling sprocket hub of claim 5 wherein said oil discharge aperture registers with said longitudinal axis of said crank-arm means and discharges oil into said relief recess.

7. The quick change self-oiling sprocket hub of claim 6 wherein said oil discharge aperture is disposed in proximity to the edge where the first ring means is bound to the second ring means.

8. The quick change self-oiling sprocket hub of claim 7 additionally comprising an oil cap means threadably engaged to said oil input aperture.

9. The quick change self-oiling sprocket hub of claim 8 comprising five locating pins disposed along the second ring flange means such as to have about a 92° arc in between any two given locating pins.

10. The quick change self-oiling sprocket hub of claim 6 additionally comprising in combination therewith a wrench having a pair of dowell means which insert into any two given ring apertures for tightening and loosening the compressor ring means around and from the first ring means.

11. The quick change self-oiling sprocket hub of claim 10 wherein said pair of dowell means insert into any two given every other ring apertures.

12. The quick change self-oiling sprocket hub of claim 11 wherein said wrench has a structure defining a broach aperture.

13. The quick change self-oiling sprocket hub of claim 6 additionally comprising at least one sprocket means wherein said sprocket means has a structure defining at least one pin aperture wherethrough said locating pin removably lodges for releasably holding and supporting the sprocket means to said second ring flange.

14. The quick change self-oiling sprocket hub of claim 13 additionally comprising an adapter ring means with at least one adaptor aperture in order for mounting the adaptor ring to the second ring flange, after said sprocket means is mounted thereon, by slidably passing said locating pin through said adaptor aperture, a second sprocket means mounted to said secured ring flange after said adaptor ring and having a structure defining at least one second pin aperture wherethrough said locating pin removably lodges to be releasably held and supported by said second ring flange.

15. The quick change self-oiling sprocket hub of claim 13 wherein said sprocket means is a split sprocket having two sprocket parts.

16. A quick change self-oiling sprocket hub comprising a hub means having a structure defining a hub flange and a hollow hub section with at least one oil aperture; a means bound to the hub means for releasably holding at least one sprocket means to the hub means; and a means releasably secured to the hollow hub section for retaining said sprocket means to said means for releasably holding and for compressing said sprocket means against the hub flange; wherein said hollow hub section comprises a structure defining an oil intake aperture and an oil discharge aperture; and wherein said means releasably secured to the hollow hub section for retaining said sprocket means against the hub flange comprises a compressor ring retainer means with a plurality of ring apertures disposed on its perimeter and threadably engaged to the hollow hub section.

17. The quick change self-oiling sprocket hub of claim 16 comprising
at least one locating pin means secured to said hub flange for releasably holding the sprocket means to said hub flange;
said hub flange has a relief recess wherethrough oil flows from the oil discharge aperture to contact said sprocket means;
and a crank-arm means with a longitudinal axis and having a first crank-end integrally bound centrally to said hollow hub section.

18. The quick change self-oiling sprocket hub of claim 17 additionally comprising a hub opening extending through said first crank-end and said hub means;
said crank-arm means additionally comprises a second crank end with a crank-arm aperture; said oil discharge aperture registers with said longitudinal axis of said crank-arm means and discharges oil into said relief recess;
said oil discharge aperture is disposed in said hollow hub section in close proximity to said hub flange; and
an oil cap means threadably engaged to said oil input aperture.

19. The quick change self-oiling sprocket hub of claim 18 additionally comprising in combination therewith a wrench having a pair of dowell means which insert into any two given ring apertures for tightening and loosening the compressor ring means around the hollow hub section;
and at least one sprocket means wherein said sprocket means has a structure defining at least one pin wherethrough said locating pin removably lodges for releasably holding and supporting the sprocket means to said hub flange.

20. A quick change sprocket hub comprising a hub means having a structure defining a hub flange means and a threaded circumference means;
at least one locating pin means secured to said hub flange means for releasably holding at least one sprocket means to said hub flange means; and
a compressor ring retainer means with a plurality of ring apertures circumferentially disposed on its perimeter and threadably engaged to the threaded circumference means of the hub flange means.

21. The quick change sprocket hub of claim 20 additionally comprising a crank-arm means with a longitudinal axis and having a first crank end integrally bound centrally to said hub flange means.

22. The quick change sprocket hub of claim 21 wherein said hub means additionally comprises a hub recess.

23. The quick change sprocket hub of claim 22 additionally comprising in combination therewith a wrench having a pair of dowell means which insert into any two given ring apertures for tightening and loosening the compressor ring means around the threaded circumference means of the hub means;
and at least one sprocket means wherein said sprocket means has a structure defining at least one pin wherethrough said locating pin removably lodges for releasably holding and supporting the sprocket means to said hub flange means.

* * * * *